(12) United States Patent  (10) Patent No.: US 9,256,389 B2
Maki  (45) Date of Patent: Feb. 9, 2016

(54) PRINTING APPARATUS, CONTROL METHOD THEREFOR, AND COMPUTER-READABLE MEDIUM

(71) Applicant: CANON KABUSHIKI KAISHA, Tokyo (JP)

(72) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/274,580

(22) Filed: May 9, 2014

(65) Prior Publication Data
US 2014/0340702 A1 Nov. 20, 2014

(30) Foreign Application Priority Data

May 16, 2013 (JP) ................................. 2013-104177

(51) Int. Cl.
*G06K 15/00* (2006.01)
*G06F 3/12* (2006.01)
(52) U.S. Cl.
CPC ............ *G06F 3/1285* (2013.01); *G06F 3/1203* (2013.01); *G06F 3/1238* (2013.01); *G06F 3/1274* (2013.01)
(58) Field of Classification Search
None
See application file for complete search history.

(56) References Cited

U.S. PATENT DOCUMENTS

| 2011/0170131 | A1* | 7/2011 | Kondo | .......................... 358/1.14 |
| 2011/0286033 | A1* | 11/2011 | Konita et al. | ................. 358/1.15 |
| 2012/0229853 | A1* | 9/2012 | Okada | ........................... 358/1.15 |

FOREIGN PATENT DOCUMENTS

JP 2000076028 A 3/2000

* cited by examiner

*Primary Examiner* — Dov Popovici
(74) *Attorney, Agent, or Firm* — Canon USA, Inc., IP Division (57) ABSTRACT

A printing apparatus includes a reception unit configured to receive print data from an external apparatus, a storage unit configured to store the print data, an operation unit configured to receive an operation to be performed on the print data, a printing unit configured to print the print data when the received operation is print operation, a charging unit configured to start charging in response to the printing of the data when the printing apparatus is operating in charge mode, and a control unit configured to perform control in such a manner that the print data is deleted when the received operation is cancel operation. When the printing apparatus is operating in the charge mode, the control unit performs control in such a manner that the print data is not deleted even when the cancel operation is instructed, until print operation is received.

5 Claims, 9 Drawing Sheets

PRINT JOB OPERATION SCREEN

| SELECT | TYPE | RECEPTION NUMBER | TIME | JOB NAME | USER NAME | STATE |
|---|---|---|---|---|---|---|
| | | 0001 | 16:10 | Document1 | User1 | PRINTING |
| | SECURE | 0002 | 16:20 | Document2 | User1 | STANDBY |
| | SECURE | 0003 | 16:30 | Document3 | User2 | STANDBY |
| | SECURE | 0004 | 16:40 | Document4 | User3 | STANDBY |
| | SECURE | 0005 | 16:50 | Document5 | User1 | STANDBY |
| | SECURE | 0006 | 17:05 | Document6 | User4 | STANDBY |
| | SECURE | 0006 | 17:06 | Document7 | User3 | STANDBY |
| | SECURE | 0007 | 17:10 | Document8 | User2 | STANDBY |

*06005* — (SELECT column checkboxes)

[CANCEL] *06004*  [PRINT] *06003*

PRINT JOB OPERATION SCREEN

| SELECT | TYPE | RECEPTION NUMBER | TIME | JOB NAME | USER NAME | STATE |
|---|---|---|---|---|---|---|
| | | 0001 | 16:10 | Document1 | User1 | PRINTING |
| V | SECURE | 0002 | 16:20 | Document2 | User1 | STANDBY |
| | SECURE | 0003 | 16:30 | Document3 | User2 | STANDBY |
| | SECURE | 0004 | 16:40 | Document4 | User3 | STANDBY |
| | SECURE | 0005 | 16:50 | Document5 | User1 | STANDBY |
| | SECURE | 0006 | 17:05 | Document6 | User4 | STANDBY |
| | SECURE | 0006 | 17:06 | Document7 | User3 | STANDBY |
| | SECURE | 0007 | 17:10 | Document8 | User2 | STANDBY |

*06005*

[CANCEL] *06004*  [PRINT] *06003*

PRINT JOB OPERATION SCREEN

| SELECT | TYPE | RECEPTION NUMBER | TIME | JOB NAME | USER NAME | STATE |
|---|---|---|---|---|---|---|
| | | 0001 | 16:10 | Document1 | User1 | PRINTING |
| V | SECURE | 0002 | 16:20 | Document2 | User1 | STANDBY |
| | SECURE | 0003 | 16:30 | Document3 | User2 | STANDBY |
| | SECURE | 0004 | 16:40 | Document4 | User3 | STANDBY |
| | SECURE | 0005 | 16:50 | Document5 | User1 | STANDBY |
| | SECURE | 0006 | 17:05 | Document6 | User4 | STANDBY |
| | SECURE | 0006 | 17:06 | Document7 | User3 | STANDBY |
| | SECURE | 0007 | 17:10 | Document8 | User2 | STANDBY |

[ CANCEL ]  [ PRINT ]

FIG.6D

PRINT JOB OPERATION SCREEN

| SELECT | TYPE | RECEPTION NUMBER | TIME | JOB NAME | USER NAME | STATE |
|---|---|---|---|---|---|---|
| V | | 0001 | 16:10 | Document1 | User1 | PRINTING |
| | SECURE | 0002 | 16:20 | Document2 | User1 | STANDBY |
| | SECURE | 0003 | 16:30 | Document3 | User2 | STANDBY |
| | SECURE | 0004 | 16:40 | Document4 | User3 | STANDBY |
| | SECURE | 0005 | 16:50 | Document5 | User1 | STANDBY |
| | SECURE | 0006 | 17:05 | Document6 | User4 | STANDBY |
| | SECURE | 0006 | 17:06 | Document7 | User3 | STANDBY |
| | SECURE | 0007 | 17:10 | Document8 | User2 | STANDBY |

[ CANCEL ]  [ PRINT ]

FIG.6E

PRINT JOB OPERATION SCREEN (06001)

| SELECT | TYPE | RECEPTION NUMBER | TIME | JOB NAME | USER NAME | STATE |
|---|---|---|---|---|---|---|
| V | SECURE | 0002 | 16:20 | Document2 | User1 | PRINTING |
|  | SECURE | 0003 | 16:30 | Document3 | User2 | STANDBY |
|  | SECURE | 0004 | 16:40 | Document4 | User3 | STANDBY |
|  | SECURE | 0005 | 16:50 | Document5 | User1 | STANDBY |
|  | SECURE | 0006 | 17:05 | Document6 | User4 | STANDBY |
|  | SECURE | 0006 | 17:06 | Document7 | User3 | STANDBY |
|  | SECURE | 0007 | 17:10 | Document8 | User2 | STANDBY |

06005 (SELECT column), 06002, CANCEL (06004), PRINT (06003)

PRINTING APPARATUS, CONTROL METHOD THEREFOR, AND COMPUTER-READABLE MEDIUM

BACKGROUND OF THE INVENTION

1. Field of the Invention

The present invention relates to a printing apparatus capable of printing print data received from an external apparatus.

2. Description of the Related Art

In recent years, there has been known a system that reserves print data transmitted from an external apparatus such as a personal computer (PC) in a printing apparatus and prints the print data in response to a user's predetermined operation on an operation panel of the printing apparatus. The printing in this manner is called reservation printing.

An example of a conventional technique regarding reservation printing can be found in Japanese Patent Application Publication No. 2000-76028. Japanese Patent Application Publication No. 2000-76028 suggests a method where a PC adds a password to a print job and transmits the print job to a printing apparatus. The printing apparatus prints transmitted data of the print job in response to a password input on the operation panel of the printing apparatus, when it is the same as the added password. This method for reservation printing may be also called secure printing, confidential printing, private printing, and authentication printing.

In general, a user is required to input a password to perform print operation of a reserved print job, but user operation to cancel a print job (hereinafter referred to as "cancel operation") is not restricted.

There are mainly three reasons why cancel operation is not generally restricted. The first reason is that security of a print product can be maintained even without restricting cancel operation of a secure print job because there is no chance for others to see the print product. The second reason is that there is an upper limit to the number of secure print jobs that can be reserved in the printing apparatus. More specifically, there is a possibility that secure print jobs reserved in the printing apparatus may be left as it is for a long time. When the number of the reserved secure print jobs reaches the reservable upper limit, the printing apparatus cannot receive secure print jobs any more. If cancel operation of secure print jobs are restricted in such a situation, only a user knowing the passwords of the secure print jobs left in the printing apparatus could cancel the print jobs. The third reason is to improve operability. When a secure print job has been transmitted mistakenly or a secure print job becomes unnecessary due to change of a situation after transmission of the secure print job, a user cancels the secure print job on an operation unit of the printing apparatus. At that time, if the user is required to input a password, the operation would become complicated.

SUMMARY OF THE INVENTION

According to an aspect of the present invention, a printing apparatus includes a reception unit configured to receive print data from an external apparatus, a storage unit configured to store the print data received by the reception unit, an operation unit configured to receive an operation to be performed on the print data stored in the storage unit, from a user, a printing unit configured to print the print data stored in the storage unit when the operation received through the operation unit is a print operation, a charging unit configured to start charging in response to the printing of the data by the printing unit when the printing apparatus is operating in charge mode, and a control unit configured to delete the print data stored in the storage unit when the operation received through the operation unit is cancel operation, wherein the control unit performs control in such a manner that the print data is not deleted even when the cancel operation received through the operation unit at least until the control unit receives a print operation from the operation unit in a case where the printing apparatus is operating in the charge mode.

According to the present invention, it is possible to prevent print data from being mistakenly deleted in a printing apparatus operating in charge mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 (which includes FIGS. 5A and 5B) is a flowchart illustrating a process for performing print operation or cancel operation of a print job through an operation screen displayed on an operation unit of the Multi Function Peripheral.

DESCRIPTION OF THE EMBODIMENTS

Various exemplary embodiments, features, and aspects of the invention will be described in detail below with reference to the drawings.

In this exemplary embodiment, a printing apparatus configured to print the data received from an external apparatus will be described. Terms used to describe the exemplary embodiment will be firstly defined. In the exemplary embodiment, a print job with a password added by the external apparatus is referred to as a "secure print job". The printing apparatus is operating as follows when the printing apparatus receives print data of a secure print job from the external apparatus. That is, the printing apparatus stores (reserves) the print data in a storage device. In response to a user's print operation through an operation unit and input of the password by the user, the printing apparatus outputs a print product.

The printing apparatus of the exemplary embodiment requires a user to input a password when the user performs print operation of a secure print job, but does not require a user to input a password when the user performs canceling processing of a secure print job (cancel operation). There are mainly three reasons as follows. The first reason is that security of a print product can be maintained even without placing restrictions on the cancel operation of a secure print job because there is no chance for others to see the print product.

The second reason is there is an upper limit to the number of secure print jobs that can be reserved in the printing apparatus. More specifically, there is a possibility that secure print jobs reserved in the printing apparatus may be left for a long time. When the number of the reserved secure jobs reaches the reservable upper limit, the printing apparatus cannot receive secure print jobs any more. When restrictions are placed on cancel operation of secure print jobs in such a situation, only a user knowing the passwords of the secure print jobs left in the printing apparatus could cancel the print jobs. The third reason is improvement of operability. When a secure print job has been transmitted mistakenly or a secure print job has become unnecessary due to change of a situation after transmission of the secure print job, a user cancels the secure print job on the operation unit of the printing apparatus. At that time, if the user is required to input a password, the operation would become complicated.

In the exemplary embodiment, a Multi Function Peripheral having at least one function to process secure print jobs will be described as an example of a printing apparatus. However, the exemplary embodiment can also be applied to any devices having the relevant function, such as Single Function Peripherals (SFP) that generally have such a function.

Meanwhile, a Multi Function Peripheral may be installed in an environment where many unspecified users are present (for example, manga (comics) cafes, internet cafes, convenience stores, and hotel lobbies). In this case, the Multi Function Peripheral is installed together with a charging apparatus that charges a user who has used the print service.

If no restriction is placed on cancel operation of print jobs, the Multi Function Peripheral installed in this environment may allow intentional cancel of a user's print job by others. More specifically, it may be possible that "a print job sent by a user, is not found in the printing apparatus".

Therefore, the Multi Function Peripheral of the exemplary embodiment provides measures to prevent mistaken deletion of print data in printing apparatuses operating in charge mode.

Figure 1:
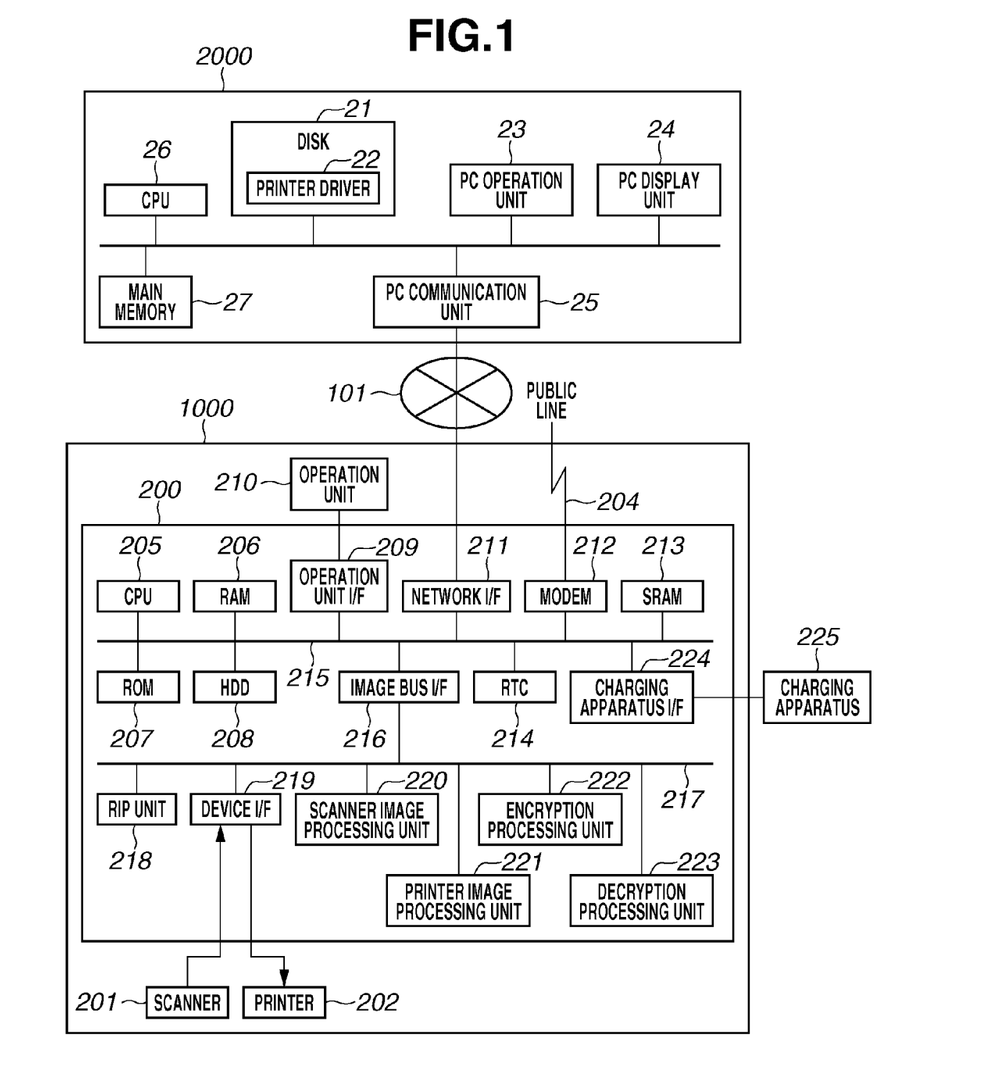
FIG. 1 is a whole view of a network system including a Multi Function Peripheral as an example of a printing apparatus and a PC as an example of an external apparatus.

A lower part of FIG. 1 is a block diagram illustrating a schematic configuration of a Multi Function Peripheral 1000 according to the exemplary embodiment. A control unit 200 is connected with a scanner 201 serving as an image input device, a printer 202 serving as an image output device, and a charging apparatus 225. The control unit 200 is also connected to a network 101 or a public line 204 to transmit/receive image information or device information.

A CPU 205 is a processor configured to control the Multi Function Peripheral 1000. A RAM 206 is a system work memory used when the CPU 205 operates. The RAM 206 also works as a memory for temporarily storing image data, user information, and password. A ROM 207 is a boot ROM for storing a boot program of the system. A HDD 208 is a hard disk drive that stores system software, applications, and image data. The HDD 208 also stores programs to execute flowcharts to be described below in the exemplary embodiment.

Each step of the flowcharts of the exemplary embodiment is realized by the CPU 205 running a program stored in the HDD 208. However, other processors may execute each step of the flowcharts instead of the CPU 205. Alternatively, the CPU 205 and another processor may cooperate to execute processing of the flowcharts.

An operation unit interface 209 is an interface with an operation unit 210 that is provided with a touch panel. The operation unit interface 209 displays screen data, which is to be displayed on the operation unit 210. The operation unit interface 209 also transfers information input by a user through the operation unit 210 to the CPU 205. A Network I/F 211 is connected to the network 101 to input/output information. A MODEM 212 is connected to a public line 204 to input/output information. An SRAM 213 is a nonvolatile recording medium capable of operating at a high speed. An RTC 214 is a real time clock and continuously counts current time even when the control unit 200 is not powered on. The devices described above are arranged on a system bus 215.

An Image Bus I/F 216 is a bus bridge connecting the system bus 215 and an image bus 217 that transfers image data at a high speed, and transforming data structure. The image bus 217 is a PCI bus or an IEEE 1394 bus. Devices to be described below are arranged on the image bus 217. A RIP unit 218 is a raster image processor that develops a PDL code into a bit map image. A device I/F 219 connects the scanner 201 and the printer 202 as image input/output devices with the control unit 200 to convert image data between synchronous data and asynchronous data. A scanner image processing unit 220 corrects, processes, and edits input image data. A printer image processing unit 221 performs correction of the printer and resolution conversion on print output image data. An encryption processing unit 222 performs encryption processing on input data including image data. A decryption processing unit 223 performs decryption processing on encrypted data.

Next, processing of a printer driver to transmit a secure print job will be described with reference to FIGS. 1, 2, 3A, and 3B.

Next, a hardware structure of a PC 2000 will be described as an example of an external apparatus. The PC 2000 includes a CPU 26, a main memory 27, a disk 21, a PC operation unit 23, a PC communication unit 25, and a PC display unit 24. The CPU 26 is a processor configured to control operation of the PC 2000. The CPU 26 loads programs stored in the disk 21 into the main memory 27 to perform various processing. In the disk 21, various programs including an operating system (OS) and document generating applications are stored although the programs are not illustrated in the Figs. In the disk 21, a printer driver program (hereinafter simply referred to as a printer driver) 22 corresponding to the Multi Function Peripheral 1000 is also stored.

The PC communication unit 25 transmits/receives various kinds of information with other devices connected with the network 101. The PC operation unit 23 such as a mouse or a keyboard functions as an input device that receives input from a user. The PC display unit 24 such as a liquid crystal display functions as an output device that outputs data having been processed by the CPU 26.

Figure 2:
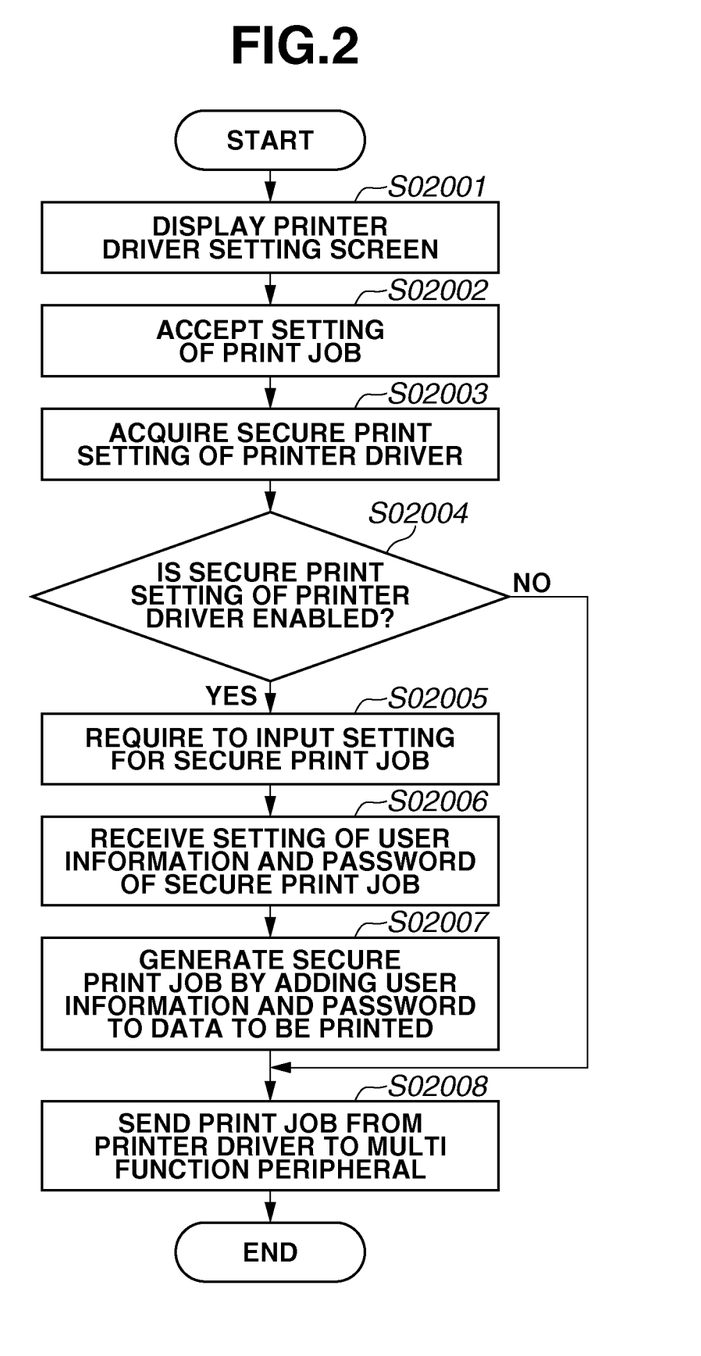
FIG. 2 is a flowchart illustrating a process performed by a printer driver to transmit print data.
Figure 3A:
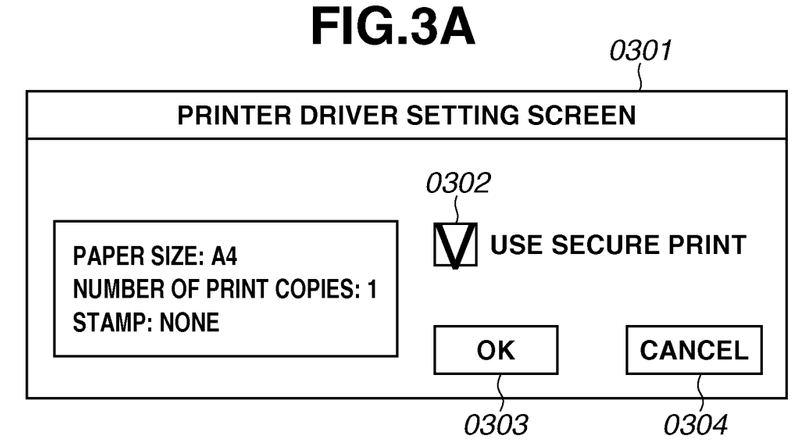
FIGS. 3A and 3B illustrate an example of setting screens of the printer driver.
Figure 3B:
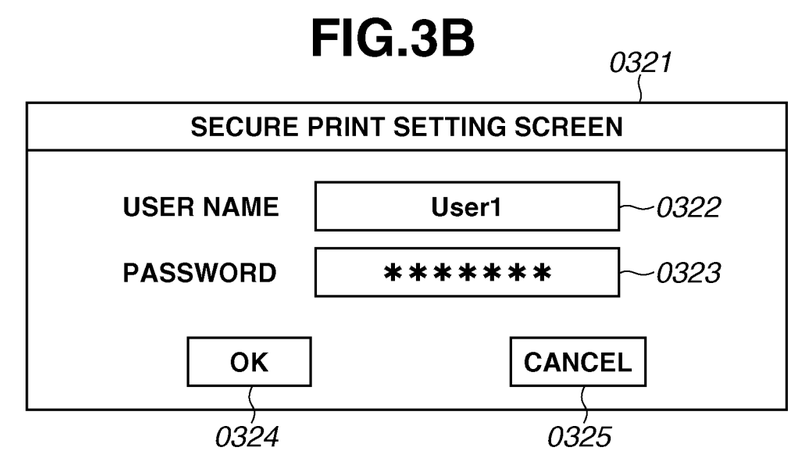

FIG. 2 is a flowchart illustrating a process for transmitting print data by the printer driver of the PC 2000. FIG. 3 is an example of a setting screen of the printer driver. Each step of the flowchart of FIG. 2 is realized by the CPU 26 executing a program loaded from the disk 21 into the main memory 27.

In step S02001 of FIG. 2, the PC operation unit 23 receives instruction to display a setting screen 0301 from a user, and the CPU 26 displays the setting screen 0301 of FIG. 3A on the PC display unit 24. On the setting screen 0301, a user can make settings regarding printing such as use/non-use secure print, a paper size, and the number of print copies.

In step S02002, the PC operation unit 23 receives operation of the setting screen 0301 made by a user, and the CPU 26 makes settings of a print job. A user desiring to use secure print selects and checks a use secure print button 0302 in the setting screen 0301 from the PC operation unit 23. The screen example of FIG. 3A illustrates a state where the use secure print button 0302 is checked and secure print setting is enabled. Note that, the printer driver can be configured to set the use secure print option forcibly. More specifically, in a case where it is desirable to restrict users using PCs to secure print only, the use secure print button 0302 is always kept checked so that the users are unable to uncheck the button. For example, when a printing apparatus installed in a manga cafe or an internet cafe offers print service, a printing system is configured to charge as to secure print jobs. Therefore, the restriction can be placed on a printer driver installed in PCs within the stores as described above, whereby it is possible to force users to use secure print.

After the setting is completed in step S02002, a user presses a print job setting complete button 0303. The printer driver 22 acquires the setting of the use secure print button 0302 (S02003). Then, the CPU 26 proceeds to step S02004.

When the printer driver 22 determines that the use secure print button 0302 is disabled in step S02004, the printer driver 22 transmits a normal print job to the Multi Function Peripheral 1000 (S02008). When the printer driver 22 determines that the use secure print button 0302 is enabled in step S02004, the CPU 26 displays a secure print job setting screen on the PC display unit 24 to require a user to set a secure print job (S02005).

FIG. 3B illustrates the secure print setting screen 0321 displayed in step S02005. In the exemplary embodiment, a user name and a password can be set to a secure print job. At this time, user information of the PC 2000 being used by the user can be set as a default value of a user name input form 0322. The printer driver 22 may set a default value in the password input form 0323.

In step S02006, the printer driver 22 receives setting information that is necessary for a secure print job and has been set by the user through the PC operation unit 23. In the exemplary embodiment, specific setting information that is necessary is a user name and a password. The user name input form 0322 displayed on the PC display unit 24 as illustrated in FIG. 3B is an input form of the printer driver 22 to prompt the user to input a user name through the PC operation unit 23. The password input form 0323 displayed on the PC display unit 24 is an input form of the printer driver 22 to prompt the user to input a password through the PC operation unit 23. When the PC operation unit 23 is informed that a secure print job setting complete button 0324 is pressed, the printer driver 22 reflects the setting.

In step S02007, the printer driver 22 generates a secure print job by adding the user name and the password to print data.

In step S02008, the printer driver 22 transmits the print job to the Multi Function Peripheral 1000 through the PC communication unit 25.

A process flow for transmitting print data from the printer driver 22 of the PC 2000 has been described above.

Figure 4:
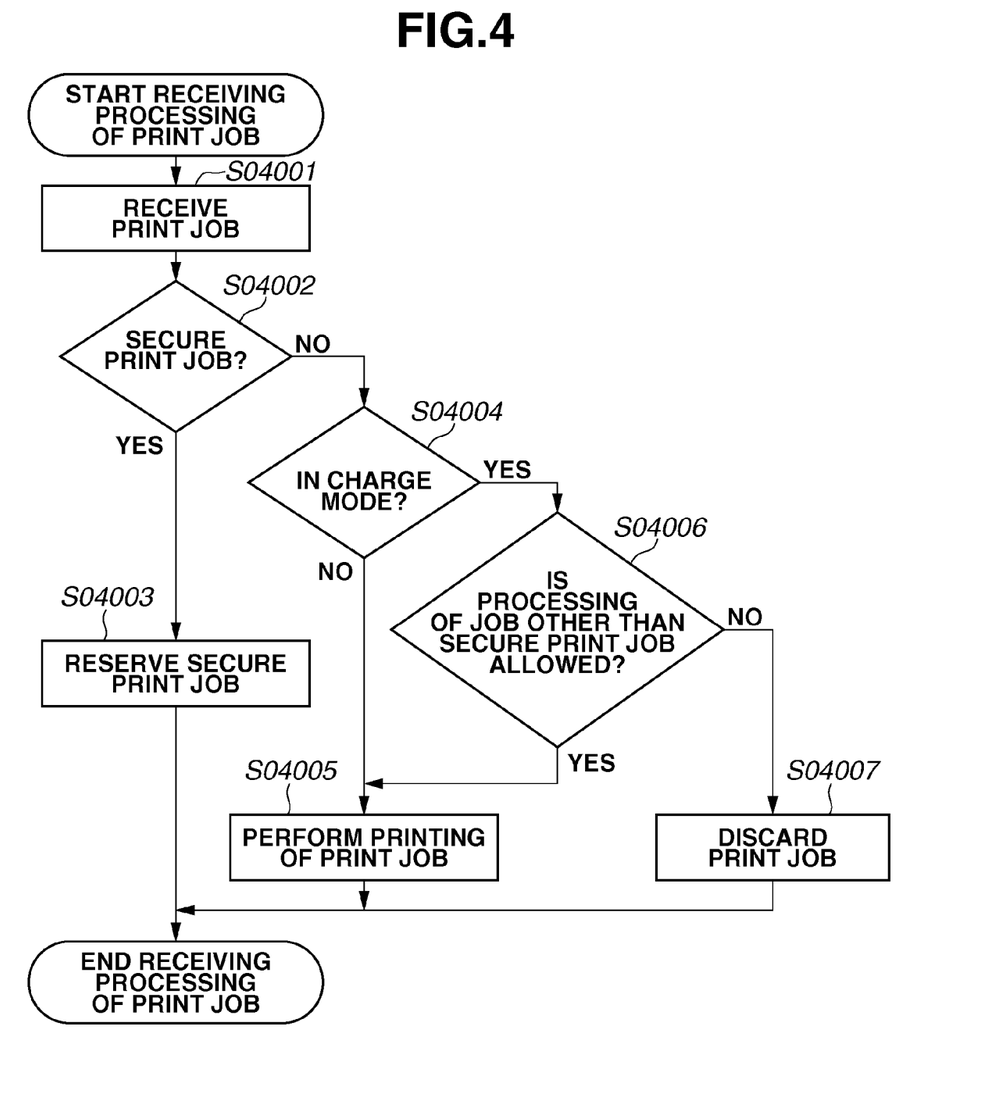
FIG. 4 is a flowchart illustrating a process performed by a Multi Function Peripheral upon reception of print data from the PC.

FIG. 4 is a flowchart illustrating a process performed by the Multi Function Peripheral 1000 when the Multi Function Peripheral 1000 receives the print data from the PC 2000. Each step of the flowchart of FIG. 4 is realized by the CPU 205 running a program loaded from the HDD 208 into the RAM 206. The CPU 205 starts the process of the flowchart of FIG. 4 in response to receipt of the print data from the PC 2000.

In step S04001, the CPU 205 receives the print data transmitted from the PC communication unit 25 through the Network I/F 211 and stores the received print data in the HDD 208. Then, the CPU 205 proceeds to step S04002.

In step S04002, the CPU 205 determines whether the received print data is a secure print job. This determination may be made based on whether a password is added to the print data, or the determination may be made based on whether a command indicating a secure print job is included in control commands, by checking the control commands which are received together with the print data.

When the CPU 205 determines that the received print data is a secure print job in step S04002, the CPU 205 does not print the received print data but reserves the print data in standby state in the HDD 208 (S04003).

When the CPU 205 determines that the received print data is not a secure print job in step S04002, that is, a normal print job, the CPU 205 proceeds to step S04004. Note that, in a normal print job, a print job is not reserved but printing is started immediately in the exemplary embodiment.

In step S04004, the CPU 205 determines whether the Multi Function Peripheral 1000 is operating in charge mode or non-charge mode. The determination is made as follows. An administrator previously sets whether to operate the Multi Function Peripheral 1000 in the charge mode. The CPU 205 acquires a setting value indicating the setting from the SRAM 213 and makes the determination based on the acquired setting value.

Note that the charge mode is a mode in which the Multi Function Peripheral 1000 installed mainly in a convenience store, a manga cafe, a hotel lobby, and the like is operating. In the mode, an individual user of the Multi Function Peripheral 1000 is charged each time the user prints. On the other hand, the non-charge mode is a mode in which the Multi Function Peripheral 1000 installed mainly in a general office environment is operating. In the mode, an individual user is not charged.

In the exemplary embodiment, when the Multi Function Peripheral 1000 is operating in the charge mode, the user is charged for secure print jobs and is not charged for normal print jobs.

When the CPU 205 determines that the Multi Function Peripheral 1000 is operating in the non-charge mode in step S04004, the CPU 205 controls the printer 202 to print the received print data (S04005).

When the CPU 205 determines that the Multi Function Peripheral 1000 is operating in the charge mode in step S04004, the CPU 205 proceeds to step S04006.

In step S04006, the CPU 205 determines whether processing of a job other than secure print jobs, i.e., a normal print job is allowed. This determination is made with reference to a previously provided setting value. The Multi Function Peripheral 1000 set to the charge mode usually charges for secure print jobs, and thus inhibits processing of normal print jobs. However, it may become desirable to process normal print jobs without charging depending on the way of use. Thus, such setting is provided.

When the CPU 205 determines that processing of a job other than secure print jobs, i.e., a normal print job is allowed in step S04006, the CPU 205 controls the printer 202 to print the print data of the print job (S04005).

When the CPU 205 determines that processing of a job other than secure print jobs, i.e., a normal print job is inhibited in step S04006, the CPU 205 discards the received print job and ends the processing.

A process performed by the Multi Function Peripheral upon receipt of print data from a PC has been described above.

Figures 5, 5A:
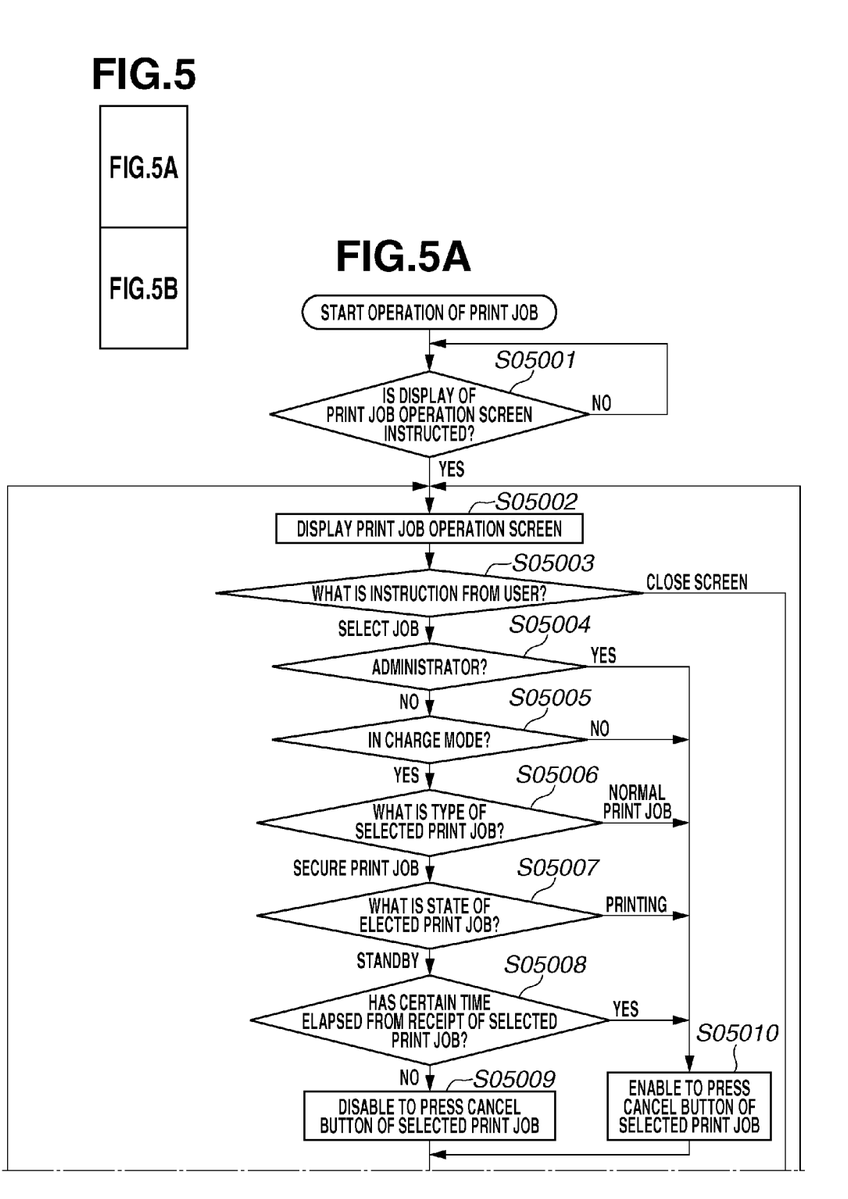
Figure 5B:
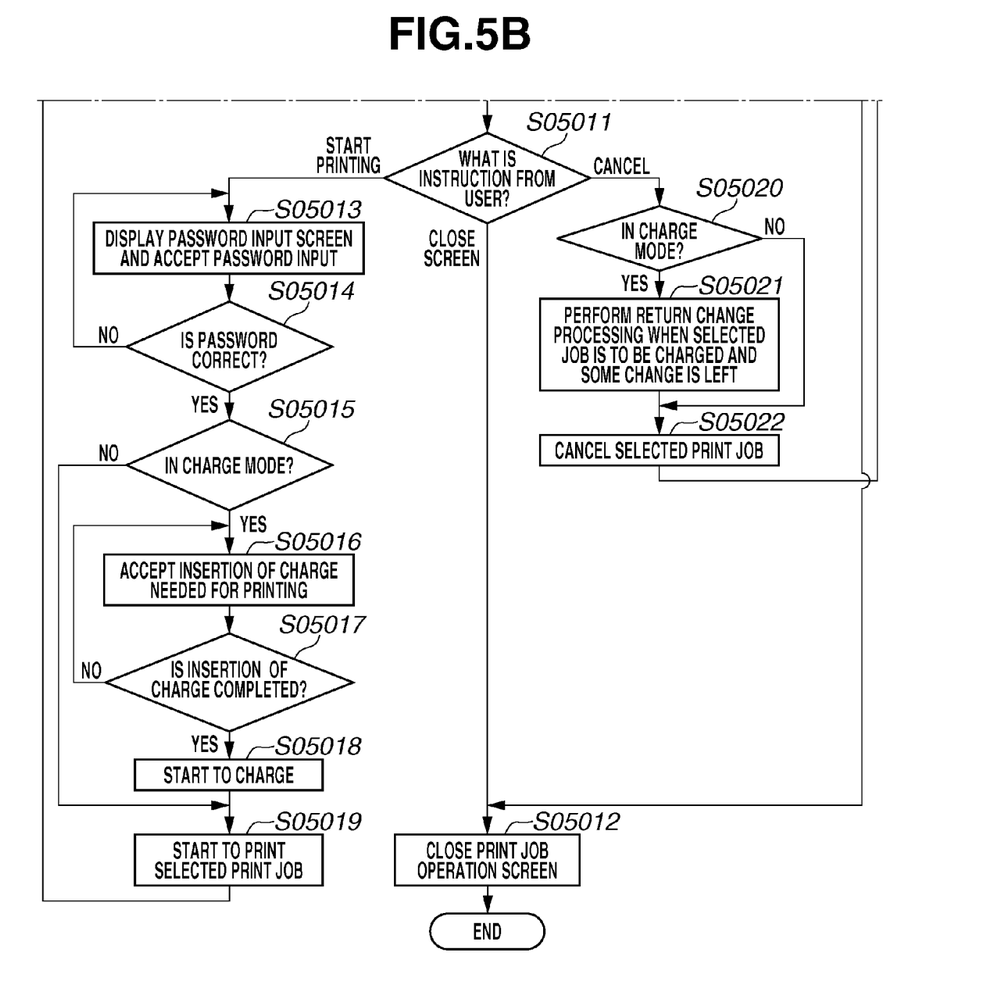

Next, processing will be described that performs print operation or cancels operation of a print job received from a PC. FIG. 5 is a flowchart illustrating a process for performing print operation or cancel operation of a print job through an operation screen displayed on the operation unit 210. FIGS. 6A to 6E are examples of the operation screen displayed on the operation unit 210 by the Multi Function Peripheral 1000 for a user to instruct print operation or cancel operation of print jobs. Each step of the flowchart of FIG. 5 is realized by the CPU 205 executing a program loaded from the HDD 208 into the RAM 206 similarly to FIG. 4.

In step S05001, the CPU 205 determines whether an instruction from a user is to display the operation screen of print jobs. When the CPU 205 determines that the instruction from the user is to display the print job operation screen, the CPU 205 proceeds to step S05002.

Figure 6A:
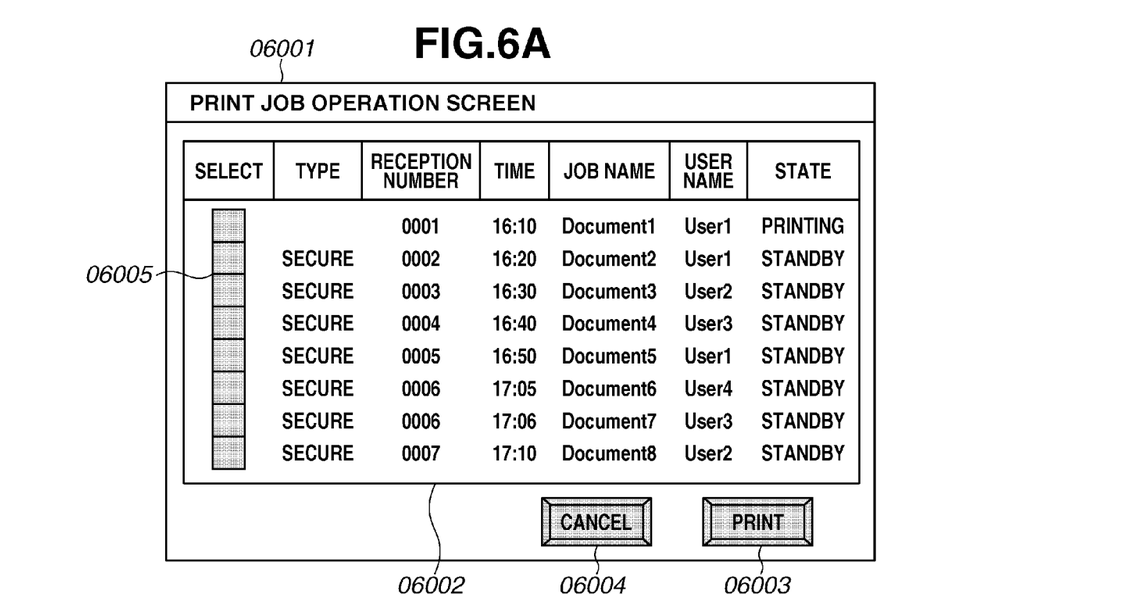
FIGS. 6A to 6E illustrate an example of print job operation screens displayed on the operation unit of the Multi Function Peripheral.

In step S05002, the CPU 205 displays an operation screen 06001 illustrated in FIG. 6A on the operation unit 210.

A job list 06002 in the operation screen 06001 is a field for displaying a list of print jobs. Note that the list of print jobs includes secure print jobs and a normal print job, which can be confirmed by the column of "type". As described above, a normal print job means a job that is not reserved but starts printing immediately. In the "type" column, "secure" is put for a secure print job, and nothing is put for a normal print job. The state of print jobs can be confirmed from the "state" columns. In the "state" column, "printing" is a job which is in the middle of printing the data, and "standby" is a secure print job waiting for printing.

Using job selection check boxes 06005, a user can select a print job that the user is going to operate. A print job selected by a user using the job selection check boxes 06005 can be operated by the user. By pressing a PRINT button 06003, a user can start print operation of a secure print job among the print jobs. When a user selects a secure print job and then presses the PRINT button 06003, the control unit 1 displays a password input screen (not illustrated) for the secure print job. The user completes the operation for starting the printing by inputting a password which has been added to the job, on the password input screen. However, when the input password does not match the password added to the job, the control unit 1 does not perform the operation for starting the printing. When the Multi Function Peripheral 1000 of the exemplary embodiment is operating in charge mode, in addition to matching of the passwords, charge required for printing has to be paid in some manner, as conditions for the control unit 1 to start the printing. The manner of paying charge will not be particularly described in the exemplary embodiment, but a coin vender or a prepaid card may be used.

By pressing a CANCEL button 06004, the user can cancel the selected print job.

In step S05002, the CPU 205 displays the PRINT button 06003 and the CANCEL button 06004 with shading (gray out) as illustrated in FIG. 6A to perform control not to allow pressing of the buttons. This is because no print job is yet selected by a user.

In step S05002, the CPU 205 displays a print job operation screen 6001 on the operation unit 210 and then proceeds to S05003.

In step S05003, the CPU 205 is waiting for an instruction from a user. Upon receipt of an instruction to close the screen from a user, the CPU 205 proceeds to step S05012 to close the operation screen 06001 and ends the processing. On the other hand, if an instruction to select a print job is received from a user through the job selection check box 06005, the CPU 205 proceeds to step S05004.

In step S05004, the CPU 205 determines whether the user who is performing the operation is an administrator. The Multi Function Peripheral 1000 has an administrator operation mode. Thus, whether the operating user is an administrator is determined according to whether the Multi Function Peripheral 1000 is operating in the administrator operation mode. In the administrator operation mode, almost all setting operation and job operation of the Multi Function Peripheral 1000 is allowed. The administrator operation mode is a mode generally used by an administrator who manages the Multi Function Peripheral 1000.

When the CPU 205 determines that the Multi Function Peripheral 1000 is operating in the administrator operation mode, i.e., the operating user is an administrator in step S05004, the CPU 205 proceeds to step S05010. When the CPU 205 proceeds from step S05004 to step S05010, the CPU 205 displays one of the print job operation screens illustrated in FIGS. 6C, 6D, and 6E on the operation unit 210. FIG. 6C illustrates a state where a secure print job (reception number 0002) which is standing by is selected by using the job selection check box 06005. FIG. 6D illustrates a state where a normal print job (reception number 0001) which is in the process of printing is selected by using the job selection check box 06005. FIG. 6E illustrates a state where a secure print job (reception number 0002) which is in the process of printing is selected by using the job selection check box 06005. The control unit 1 displays the CANCEL button 06004 without shading (gray out) to allow pressing of the button even when the selected print job is in any of the states described above. In FIGS. 6D and 6E, a print job which is in the process of printing is selected, and thus the PRINT button 06003 is displayed with shading (gray out).

The CPU 205 proceeds to step S05011 after performing the above processing in step S05010. Processing of step S05011 and the following steps will be described below.

When the CPU 205 determines that the Multi Function Peripheral 1000 is not operating in the administrator operation mode, i.e., the operating user is not an administrator in step S05004, the CPU 205 proceeds to step S05005.

In step S05005, the CPU 205 determines whether the Multi Function Peripheral 1000 is operating in the charge mode or in the non-charge mode. This determination is made in a manner similar to step S04004 of FIG. 4.

When the CPU 205 determines that the Multi Function Peripheral 1000 is operating in the non-charge mode in step S05005, the CPU 205 proceeds to step S05010. Also when the CPU 205 proceeds from step S05005 to step S05010, the control unit 1 displays one of the print job operation screens illustrated in FIGS. 6C, 6D, and 6E on the operation unit 210. That is, in the non-charge mode, the CPU 205 displays the CANCEL button 06004 for the selected print job without shading (gray out) to allow pressing of the button.

When the CPU 205 determines that the Multi Function Peripheral 1000 is operating in the charge mode in step S05005, the CPU 205 proceeds to step S05006.

In step S05006, the CPU 205 determines the type of the selected print job.

When the CPU 205 determines that the type of the selected print job is a normal print job in step S05006, the control unit 1 proceeds to step S05010. When the control unit 1 proceeds from step S05006 to step S05010, the CPU 205 displays the print job operation screen illustrated in FIG. 6D on the operation unit 210. More specifically, the CPU 205 displays the CANCEL button 06004 without shading (gray out) to enable pressing of the button for normal print jobs.

When the CPU 205 determines that the type of the selected print job is a secure print job in step S05006, the CPU 205 proceeds to step S05007.

In step S05007, the CPU 205 determines the state of the print job (secure print job) selected in step S05003.

When the CPU 205 determines that the state of the selected print job (secure print job) is printing in step S05007, the CPU 205 proceeds to step S05010. When the CPU 205 proceeds from step S05007 to step S05010, the CPU 205 displays the print job operation screen illustrated in FIG. 6E on the operation unit 210. More specifically, the CPU 205 displays the CANCEL button 06004 without shading (gray out) to enable pressing of the button for a secure print job when the state thereof is printing. That is, in the exemplary embodiment, the Multi Function Peripheral 1000 performs control such that in the case of the charge mode, print data is not deleted even when cancel operation is instructed through the operation unit 210, at least until the Multi Function Peripheral 1000 receives print operation from the operation unit 210. After once receiving print operation from the operation unit 210, the Multi Function Peripheral 1000 performs control to enable cancel operation even for a secure print job.

When the CPU 205 determines that the state of the selected print job (secure print job) is standby in step S05007, the CPU 205 proceeds to step S05008.

In step S05008, the CPU 205 determines whether a predetermined standby time has elapsed from the receipt of the selected print job (secure print job in the standby state).

When the CPU 205 determines that the predetermined standby time has elapsed from the receipt of the selected print job (secure print job in the standby state) in step S05008, the CPU 205 proceeds to step S05010. When the CPU 205 proceeds from step S05008 to step S05010, the CPU 205 displays the print job operation screen illustrated in FIG. 6C on the operation unit 210. More specifically, the CPU 205 displays the CANCEL button 06004 without shading (gray out) to enable pressing of the CANCEL button as to a secure print job in the standby state when the predetermined standby time has elapsed from receipt of the job.

When the CPU 205 determines that the predetermined standby time has not elapsed from the receipt of the selected print job (secure print job in the standby state) in step S05008, the CPU 205 proceeds to step S05009.

Figure 6B:
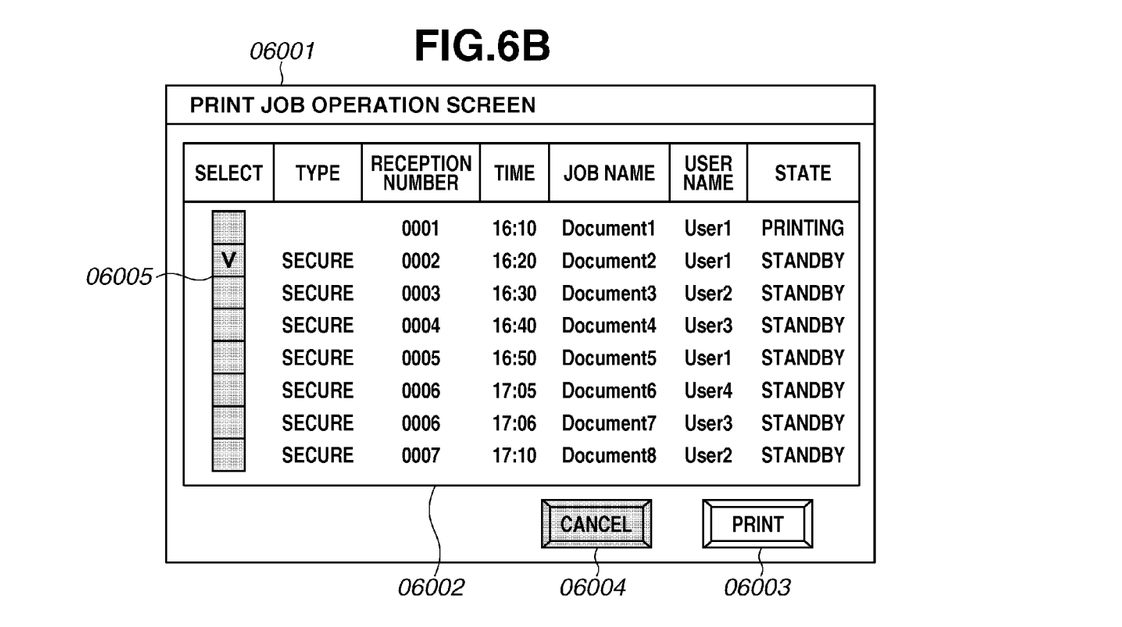
Figure 6C:
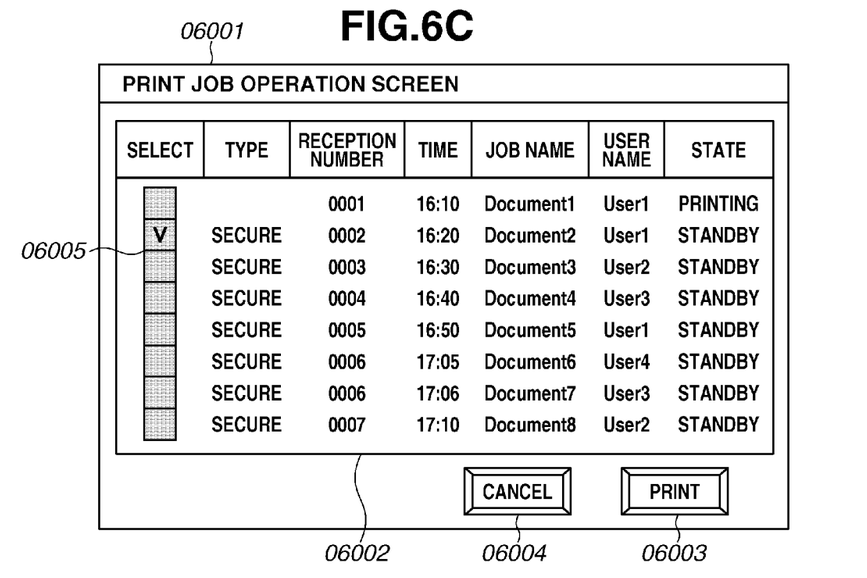
Figure 6D:
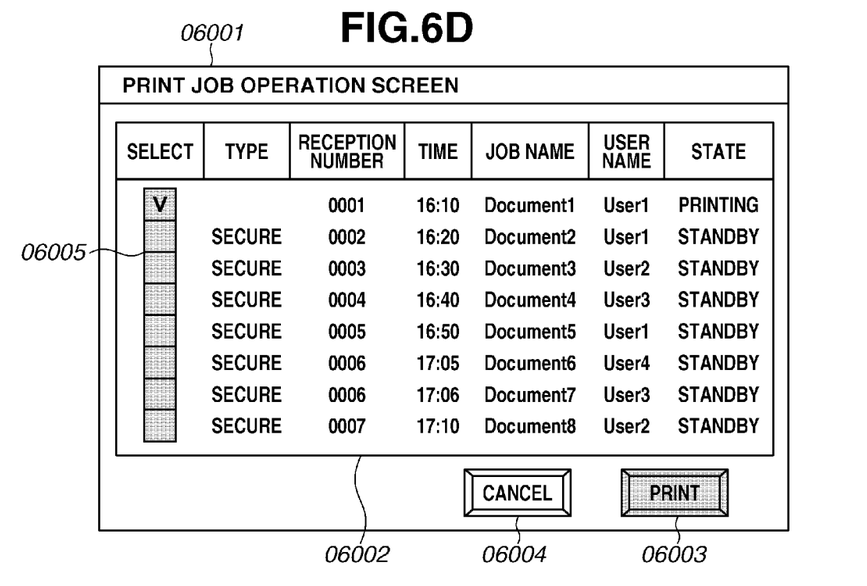
Figure 6E:
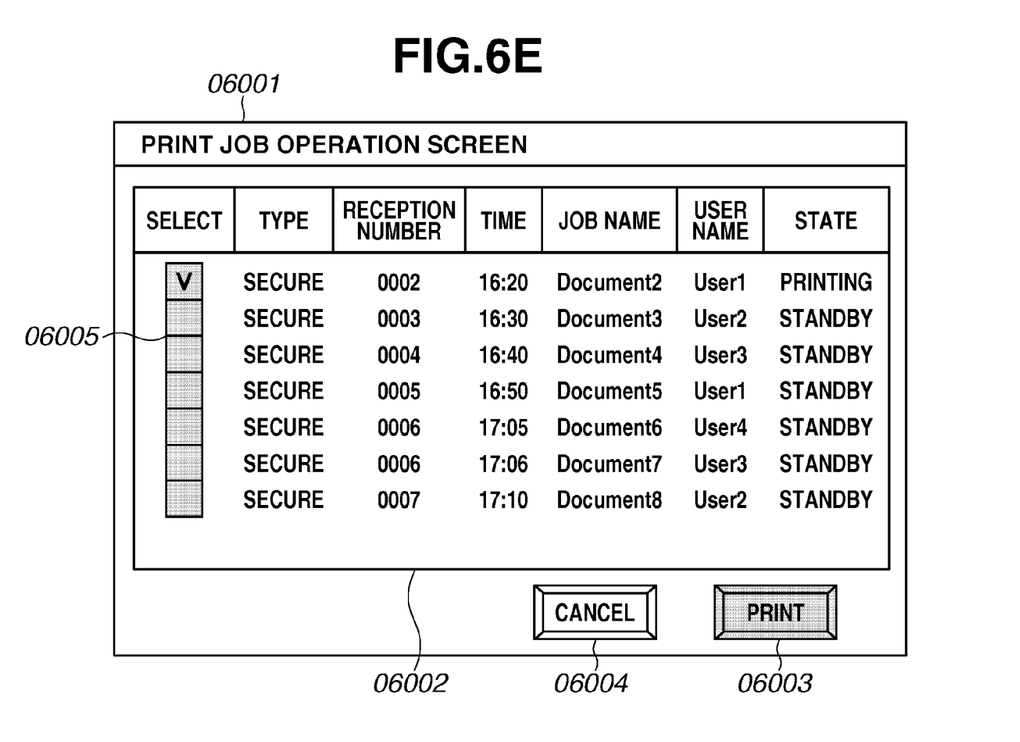

In step S05009, the CPU 205 displays the print job operation screen illustrated in FIG. 6B on the operation unit 210. More specifically, the CPU 205 displays the CANCEL button 06004 with shading (gray out) not to enable pressing of the CANCEL button as to a secure print job when it is in the standby state and the predetermined standby time has not elapsed from the receipt of the job. That is, cancel operation on a print job selected at this timing is inhibited.

When the CPU 205 displays the respective print job operation screens on the operation unit 210 in steps S05009 and S05010, the CPU 205 proceeds to step S05011.

When the CPU 205 receives instruction to close the screen from a user in step S05011, the CPU 205 proceeds to step S05012 to close the print job operation screen 06001 and ends the processing.

When an instruction received from a user in step S05011 is an instruction to start printing for the selected print job, i.e., when the PRINT button 06003 is pressed, the CPU 205 proceeds to step S05013. Note that the CPU 205 proceeds to step S05013 when the selected print job is a secure print job in the standby state.

In step S05013, the CPU 205 displays a password input screen for the selected print job, receives password input, and proceeds to step S05014.

In step S05014, the CPU 205 determines whether the input password matches the password of the selected print job. When the input password does not match the password of the selected print job, the CPU 205 returns to step S05013 to receive password input again. When the input password matches the password of the selected print job, the control unit 1 proceeds to step S05015.

In step S05015, the CPU 205 determines whether the Multi Function Peripheral 1000 is operating in the charge mode.

When the CPU 205 determines that the Multi Function Peripheral 1000 is not operating in the charge mode (operating in the non-charge mode) in step S05015, the control unit 1 proceeds to step S05019 to start printing for the selected print job and then returns to step S05002.

When the CPU 205 determines that the Multi Function Peripheral 1000 is operating in the charge mode in step S05015, the control unit 1 proceeds to step S05016.

In step S05016, the CPU 205 accepts charge through the charging apparatus 225 and proceeds to step S05017 to determine whether charge required for processing of the selected print job is put in. Although it is not particularly described in the exemplary embodiment, a coin vender or a prepaid card may be used for the charging When the CPU 205 determines that the charge is insufficient in the step S05017, the CPU 205 continues to accept charge in step S05016.

When the CPU 205 determines that the charge insertion is completed in step S05017, the control unit 1 proceeds to step S05018.

The control unit 1 performs processing for the inserted charge in step S05018, starts printing for the selected print job in step S05019, and returns to step S05002. Specifically, the charge processing is carried out every time an image is printed on paper and the paper is discharged to a discharge bin (not illustrated).

When the instruction from a user is an instruction to cancel the selected print job in step S05011, i.e., when the CANCEL button 06004 is pressed, the control unit 1 proceeds to step S05020.

In step S05021, the CPU 205 determines whether the Multi Function Peripheral 1000 is operating in the charge mode.

When the CPU 205 determines that the Multi Function Peripheral 1000 is not operating in the charge mode (operating in the non-change mode) in step S05020, the CPU 205 proceeds to step S05022.

In S5022, the CPU 205 cancels the selected print job. More specifically, the CPU 205 deletes print data of the print job stored in the HDD 208. After completion of processing in S5022, the CPU 205 returns to step S05002.

When the CPU 205 determines that the Multi Function Peripheral 1000 is operating in the charge mode in step S05020, the CPU 205 proceeds to step S05021.

In step S05021, when the selected print job is a print job to be charged, i.e., the job is a secure print job in the case of the present exemplary embodiment and any change is left when cancelling the print job, the CPU 205 performs processing for returning the change. While the manner of returning the change is not particularly described in the exemplary embodiment, for example, when charge is put into a coin vender, the change may be returned, or when a prepaid card is used, only charge for performed printing may be deducted from the prepaid card.

When the CPU 205 completes the processing in step S05021, the CPU 205 proceeds to step S05022 to cancel the selected print job and returns to step S05002.

As described above, the Multi Function Peripheral 1000 in the exemplary embodiment inhibits cancel operation of a secure print job when the Multi Function Peripheral 1000 is operating in the charge mode. As a result, it is possible to prevent a user's print job from being mistakenly canceled or intentionally canceled by others in a case where the Multi Function Peripheral 1000 is installed in an public environment (for example, manga cafes, internet cafes, convenience stores, hotel lobbies) in the charge mode.

In addition, the Multi Function Peripheral 1000 of the exemplary embodiment allows cancel operation of a secure print job when the printing apparatus is operating in the non-charge mode (i.e., the Multi Function Peripheral is installed in a general office environment). Therefore, in the above office environment, anyone can cancel a secure print job. Thus, operability of print jobs is not deteriorated. Even in the above office environment, when it is not desirable to enable anyone to cancel print jobs freely, a user authentication device such as an IC card reader may be connected to the Multi Function Peripheral 1000, and the Multi Function Peripheral 1000 may be configured to enable cancel operation of print jobs of the authenticated user only. Thus, there is no need to worry about cancellation of a user's print job by others without permission.

Further, the Multi Function Peripheral 1000 of the exemplary embodiment allows cancel operation of a secure print job when an administrator operates a print job even when the Multi Function Peripheral 1000 is operating in the charge mode. As a result, the administrator can take measures to cancel jobs in a state of emergency such as a case where the number of secure print jobs reserved in the printing apparatus reaches the upper limit.

In addition, the Multi Function Peripheral 1000 of the exemplary embodiment operating in the charge mode performs control such that print data is not deleted even when cancel operation is instructed through the operation unit 210 at least until the Multi Function Peripheral 1000 receives print operation from the operation unit 210. Thus, it is possible to prevent a situation such as "a user finds that a print job, which has been sent by the user, is not stored in the printing apparatus". The Multi Function Peripheral 1000 that has once received print operation from the operation unit 210 performs control to enable cancel operation even for a secure print job. Thus, a user who is performing print operation can cancel printing in the progress, so that convenience is improved. Note that a password that is known only to a proper user has been input if print operation is performed and printing is started. Thus, there is no need to worry about intentional cancellation of a user's print job by others even when cancel operation is allowed.

In addition, the Multi Function Peripheral 1000 of the exemplary embodiment allows cancel operation of a secure print job after a certain standby time has elapsed from the receipt of the secure print job even when the Multi Function Peripheral 1000 is operating in the charge mode. Thus, even if a user is not an administrator, anyone can also delete a secure print job that has been left for a long time, so that convenience is improved.

In addition, the Multi Function Peripheral 1000 of the exemplary embodiment allows cancellation of an operation of a normal print job even when the Multi Function Peripheral 1000 is operating in the charge mode. As a result, in a public environment, both general users using print service and employees who do not need to be charged can use the Multi Function Peripheral 1000, for example. More specifically, general users can use secure print and employees can use normal print. Thus, the Multi Function Peripheral 1000 offers an advantage both to general users using print service (a user's job is not canceled by others) and to employees (operability is not deteriorated).

Other Exemplary Embodiment

The object of the exemplary embodiment of the present embodiment may be also achieved by performing the following processing. A storage medium, in which a program code of software that realizes functions of the above-described exemplary embodiment, can be supplied to a system or an apparatus and the program code stored in the storage medium is read by a computer (CPU, MPU, or another electric circuit) of the system or the apparatus. In this case, the program code read from the storage medium itself realizes the functions of the above-described exemplary embodiment. Thus, the program code and the storage medium storing the program code constitute an exemplary embodiment of the present invention. The storage medium may be, for example, a Random Access Memory (RAM) or a Read Only Memory (ROM). In addition, the storage medium may be a Compact Disc (CD), a Digital Versatile Disc (DVD), a Blu-ray (registered trademark) Disc, a flash memory, a memory card. Further, one or a plurality of function(s) of the above-described exemplary embodiment may be realized by one processor, a plurality of processors, or a plurality of computers on a network.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-104177 filed May 16, 2013, which is hereby incorporated by reference herein in its entirety.

What is claimed is:

1. A printing apparatus comprising:
   a reception unit configured to receive first data, to which a password is added, from an external apparatus;
   a storage unit configured to store the first data;
   an operation unit;
   a printing unit configured to print the first data when a print instruction for printing the first data and the password are input via the operation unit from a user;
   a charging unit configured to charge for the printing of the first data when the printing apparatus is operating in a charge mode;
   a deleting unit configured to delete the first data when a cancel instruction for cancelling print of the first data is input via the operation unit from a user; and
   a control unit configured to prevent the deleting unit from deleting the first data in accordance with the cancel instruction, in a case where the printing apparatus is operating in the charge mode and to allow the deleting unit to delete the first data in accordance with the cancel instruction, in a case where the printing apparatus is operating in a non-charge mode, wherein the reception unit is capable of receiving second data to which a password is not added, and wherein the printing unit is configured to print the second data without inputting a print instruction for printing the second data via the operation unit from a user when the second data is received by the reception unit, and wherein the control unit is configured to allow the deleting unit to delete the second data in accordance with a cancel instruction for cancelling print of the second data input via the operation unit from a user in a case where the second data is received by the reception unit even when the printing apparatus is operating in the charge mode.

2. The printing apparatus according to claim 1, wherein, in a case where the printing apparatus is operating in the charge mode, the control unit allows the deleting unit to delete the first data in accordance with the cancel instruction for cancelling print of the first data after the print instruction is input via the operation unit.

3. The printing apparatus according to claim 1, wherein the control unit enables the operation unit to input the cancel instruction for canceling print of the first data in a case where the printing apparatus is operating in the non-charge mode and disables the operation unit to input the cancel instruction for canceling print of the first data in a case where the printing apparatus is operating in the charge mode.

4. A control method for a printing apparatus, the printing apparatus having an operation unit, the control method comprising:

receiving first data, to which a password is added, from an external apparatus;

storing the first data in a storage device;

printing the first data when a print instruction for printing the first data and the password are input via the operation unit from a user;

charging for the printing of the first data when the printing apparatus is operating in a charge mode;

deleting the first data when a cancel instruction for cancelling print of the first data is input via the operation unit from a user; and preventing the first data from being deleted in accordance with the cancel instruction, in a case where the printing apparatus is operating in the charge mode, and allowing the deleting of the first data in accordance with the cancel instruction, in a case where the printing apparatus is operating in a non-charge mode;

receiving second data to which a password is not added;

printing the second data without inputting a print instruction for printing the second data via the operation unit from a user when the second data is received; and deleting the second data in accordance with a cancel instruction for cancelling printing of the second data input via the operation unit from a user in a case where the second data is received even when the printing apparatus is operating in the charge mode.

5. A non-transitory computer-readable medium storing a program for causing a computer to perform a control method for a printing apparatus, the printing apparatus having an operation unit, the control method comprising:

receiving first data, to which a password is added, from an external apparatus;

storing the first data in a storage device;

printing the first data when a print instruction for printing the first data and the password are input via the operation unit from a user;

charging for the printing of the first data when the printing apparatus is operating in a charge mode;

deleting the first data when a cancel instruction for cancelling print of the first data is input via the operation unit from a user; and preventing the first data from being deleted in accordance with the cancel instruction, in a case where the printing apparatus is operating in the charge mode, and allowing the deleting of the first data in accordance with the cancel instruction, in a case where the printing apparatus is operating in a non-charge mode;

receiving second data to which a password is not added;

printing the second data without inputting a print instruction for printing the second data via the operation unit from a user when the second data is received; and deleting the second data in accordance with a cancel instruction for cancelling printing of the second data input via the operation unit from a user in a case where the second data is received even when the printing apparatus is operating in the charge mode.

\* \* \* \* \*